United States Patent
Yan (10) Patent No.: US 9,922,183 B2
(45) Date of Patent: Mar. 20, 2018

(54) ELECTRONIC DEVICE AND INFORMATION PROCESSING METHOD

(71) Applicants: BEIJING LENOVO SOFTWARE LTD., Beijing (CN); LENOVO (BEIJING) LIMITED, Beijing (CN)

(72) Inventor: Yiqiang Yan, Beijing (CN)

(73) Assignees: BEIJING LENOVO SOFTWARE LTD., Beijing (CN); LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 14/868,936

(22) Filed: Sep. 29, 2015

(65) Prior Publication Data

US 2016/0364560 A1    Dec. 15, 2016

(30) Foreign Application Priority Data

Jun. 12, 2015   (CN) .......................... 2015 1 0325254

(51) Int. Cl.
| | |
|---|---|
| G06F 17/00 | (2006.01) |
| G06F 21/32 | (2013.01) |
| G06F 21/44 | (2013.01) |
| G06F 1/16 | (2006.01) |

(52) U.S. Cl.
CPC .............. *G06F 21/32* (2013.01); *G06F 21/44* (2013.01); *G06F 1/163* (2013.01)

(58) Field of Classification Search
CPC .......... G05F 21/32; G06F 21/44; G06F 21/32; G06F 1/163
See application file for complete search history.

(56) References Cited

U.S. PATENT DOCUMENTS

| | | | | |
|---|---|---|---|---|
| 9,558,336 | B2* | 1/2017 | Lee ........................ | A61B 5/681 |
| 2008/0244699 | A1* | 10/2008 | Parhofer ............... | F41A 17/063 |
| | | | | 726/2 |
| 2012/0306643 | A1* | 12/2012 | Dugan ..................... | A61B 5/02 |
| | | | | 340/539.12 |
| 2013/0086090 | A1* | 4/2013 | Partington ......... | G06K 9/00973 |
| | | | | 707/754 |
| 2014/0085050 | A1* | 3/2014 | Luna .................. | G07C 9/00087 |
| | | | | 340/5.82 |
| 2014/0160055 | A1* | 6/2014 | Margolis ................. | G06F 1/163 |
| | | | | 345/174 |

(Continued)

*Primary Examiner* — Techane Gergiso
(74) *Attorney, Agent, or Firm* — Scully Scott Murphy & Presser (57) ABSTRACT

An electronic device and an information processing method are disclosed in the disclosure. The electronic device comprises: a wearable apparatus capable of forming a ring or an approximate ring, which is able to surround a first cylinder; a first sensor arranged at least partly in the wearable apparatus and towards an interior of the ring or the approximate ring, and configured to detect first biometric information of at least part of a wearer's body surrounded by the wearable apparatus if the wearable apparatus is worn on the part of the wearer's body; a first processor arranged in the wearable apparatus, and configured to determine whether the first biometric information matches first preset biometric information to obtain a determination result and to perform security processing corresponding to the determination result based on the determination result.

18 Claims, 4 Drawing Sheets

(56) References Cited

U.S. PATENT DOCUMENTS

| | | | | |
|---|---|---|---|---|
| 2015/0028996 A1* | 1/2015 | Agrafioti | G06F 21/40 | 340/5.82 |
| 2015/0031333 A1* | 1/2015 | Lee | H04B 1/385 | 455/411 |
| 2015/0124566 A1* | 5/2015 | Lake | G04G 21/08 | 368/10 |
| 2015/0135310 A1* | 5/2015 | Lee | A61B 5/681 | 726/20 |
| 2015/0161371 A1* | 6/2015 | Hoshi | G06F 21/35 | 726/19 |
| 2015/0206364 A1* | 7/2015 | Agrafioti | G06F 21/40 | 340/5.82 |
| 2015/0230735 A1* | 8/2015 | Venkatraman | A61B 5/1112 | 600/301 |
| 2015/0230761 A1* | 8/2015 | Brumback | A61B 5/7475 | 600/479 |
| 2015/0279132 A1* | 10/2015 | Perotti | G07C 9/00309 | 340/5.52 |
| 2015/0294306 A1* | 10/2015 | Grigg | G06Q 20/3821 | 705/67 |
| 2015/0294307 A1* | 10/2015 | Grigg | G06Q 20/3821 | 726/9 |
| 2015/0313543 A1* | 11/2015 | Martinez | G06F 15/00 | 600/301 |
| 2015/0317855 A1* | 11/2015 | Sezan | A61B 5/1171 | 340/5.52 |
| 2015/0358438 A1* | 12/2015 | Kim | G04G 21/025 | 455/566 |
| 2015/0381609 A1* | 12/2015 | Dadu | H04L 63/0861 | 726/9 |
| 2016/0022220 A1* | 1/2016 | Lee | A61B 5/721 | 600/479 |
| 2016/0093197 A1* | 3/2016 | See | G08B 25/10 | 340/539.12 |
| 2016/0196558 A1* | 7/2016 | Mercille | G06Q 20/327 | 705/44 |

* cited by examiner

ELECTRONIC DEVICE AND INFORMATION PROCESSING METHOD

TECHNICAL FIELD

The present disclosure relates to the technical field of electronic technology, and more particularly, to an electronic device and an information processing method.

BACKGROUND

With the development of electronic technology, the number of types of electronic devices dramatically increases. The electronic devices are used for work, study, routine life and entertainment. As a result, large amount of user information is stored in the electronic devices. Such information may relate to information to be kept secret such as privacy, property, etc. Obviously, this involves information security. On the other hand, users can make payment by using the electronic devices. If the electronic devices are illegally possessed by other users, operations which may be harmful to the legal user's person, property, and credit security may be conducted. Therefore, usage security of the electronic devices is also of profound significance.

How to improve information security and usage security is a problem to be solved in utilization of the electronic devices.

SUMMARY

In a first aspect of the disclosure, there is provided an electronic device. The electronic device comprises:

a wearable apparatus capable of forming a ring or an approximate ring, which is able to surround a first cylinder;

a first sensor arranged at least partly in the wearable apparatus and towards an interior of the ring or the approximate ring, and configured to detect first biometric information of at least part of a wearer's body surrounded by the wearable apparatus if the wearable apparatus is worn on the part of the wearer's body;

a first processor arranged in the wearable apparatus, and configured to determine whether the first biometric information matches first preset biometric information to obtain a determination result and to perform security processing corresponding to the determination result based on the determination result.

In the above described solution, the first sensor is further configured to detect second biometric information, wherein the first biometric information is different from the second biometric information.

In the above described solution, the first sensor is further configured to acquire first detection information, wherein the first detection information is raw information required for obtaining the first biometric information and the second biometric information.

In the above described solution, the ring or the approximate ring has a first surface and a second surface;

a diameter of a circle formed by the first surface is a first diameter;

a diameter of a circle formed by the second surface is a second diameter, wherein the first diameter is larger than the second diameter;

wherein the first diameter is larger than the second diameter;

a collection window is arranged on the second surface;

the first sensor is arranged in the wearable apparatus and configured to collect, through the collection window, the first biometric information of the part of the wearer's body surrounded by the wearable apparatus.

In the above described solution, the first sensor comprises:

a transmitter configured to transmit, through the collection window, collection medium to the part of the wearer's body surrounded by the wearable apparatus;

a collector configured to collect an effect imposed by the collection medium on the part of the wearer's body surrounded by the wearable apparatus to acquire the first biometric information.

In the above described solution, the transmitter is configured to transmit, through the collection window, light with a specified wavelength to the part of the wearer's body surrounded by the wearable apparatus;

the collector is configured to collect, through the collection window, an image depicting illumination of the part of the wearer's body surrounded by the wearable apparatus by the light with the specified wavelength.

In the above described solution, the transmitter is configured to transmit, through the collection window, sound waves with a specified frequency to the part of the wearer's body surrounded by the wearable apparatus;

the collector is configured to collect, through the collection window, an image depicting reflection of the sound waves with the specified frequency from the part of the wearer's body surrounded by the wearable apparatus.

In the above described solution, the first biometric information includes inner structural characteristics of the wearer's body.

In the above described solution, the first biometric information includes information about blood vessel arrangement and/or skeleton arrangement of the wearer's body.

In the above described solution, the electronic device has a worn status and an unworn status;

the wearable apparatus forms the ring or the approximate ring in the worn status of the electronic device;

the electronic device further comprises:

a second sensor arranged in the wearable apparatus and configured to detect a status of the electronic device to obtain a detection result;

the first sensor is configured to detect the first biometric information of the part of the wearer's body surrounded by the wearable apparatus if the detection result indicates that the electronic device is switched from the unworn status to the worn status.

In the above described solution, the electronic device has a first mode and a second mode;

the first mode has a higher security level than the second mode;

the first processor is configured to set the electronic device to the first operating state if the first biometric information matches the first preset biometric information and to the second operating state if the first biometric information does not match the first preset biometric information.

In a second aspect of the disclosure, there is provided an electronic device. The electronic device comprises:

a housing;

a third sensor arranged at least partly in the housing and configured to detect an inner structure of a wearer's body within a range of a first sensor to obtain first biometric information;

a second processor arranged in the housing, and configured to determine whether the first biometric information matches first preset biometric information to obtain a determination result and to perform security processing corresponding to the determination result based on the determination result.

In a third aspect of the disclosure, there is provided an information processing method. The method comprises:

detecting first biometric information of at least part of a wearer's body surrounded by a wearable apparatus of an electronic device, if the part of the wearer's body is surrounded by the wearable apparatus;

determining whether the first biometric information matches first preset biometric information to obtain a determination result;

performing security processing corresponding to the determination result based on the determination result.

In the above described solution, the electronic device further comprises a first sensor arranged at least partly in the wearable apparatus, the first sensor being able to detect second biometric information;

the detecting the first biometric information of the part of wearer's body surrounded by the wearable apparatus comprises detecting the first biometric information by using the first sensor, wherein the first biometric information is different from the second biometric information.

In the above described solution, the detecting the first biometric information by using the first sensor comprises:

acquiring first detection information by using the first sensor, wherein the first detection information is raw information required for obtaining the first biometric information and the second biometric information;

extracting the first biometric information from the first detection information.

In the above described solution, the detecting the first biometric information of the at least part of the wearer's body surrounded by the wearable apparatus of the electronic device if the part of the wearer's body is surrounded by the wearable apparatus comprises:

transmitting collection medium to the part of wearer's body surrounded by the wearable apparatus;

collecting an effect imposed by the collection medium on the part of the wearer's body surrounded by the wearable apparatus to acquire the first biometric information.

In the above described solution, the transmitting collection medium to the part of wearer's body surrounded by the wearable apparatus comprises: transmitting light with specified wave length to the part of wearer's body surrounded by the wearable apparatus;

the collecting the effect imposed by the collection medium on the part of the wearer's body surrounded by the wearable apparatus to acquire the first biometric information comprises: collecting an image depicting illumination of the part of the wearer's body surrounded by the wearable apparatus by the light with the specified wavelength.

In the above described solution, the transmitting collection medium to the part of wearer's body surrounded by the wearable apparatus comprises: transmitting sound waves with a specified frequency to the part of wearer's body surrounded by the wearable apparatus;

the collecting the effect imposed by the collection medium on the part of the wearer's body surrounded by the wearable apparatus to acquire the first biometric information comprises: collecting an image depicting reflection of the sound waves with the specified wavelength from the part of the wearer's body surrounded by the wearable apparatus.

DETAILED DESCRIPTION OF THE EMBODIMENTS

Solutions of the disclosure will be further described below in detail in conjunction with accompanying drawings and specific embodiments.

First Device Embodiment

Figure 1:
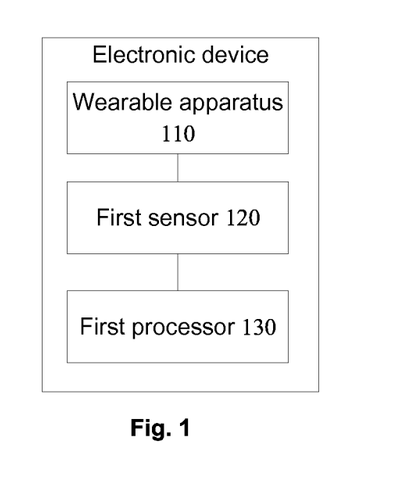
FIG. 1 is a first structural diagram of an electronic device according to an embodiment of the disclosure.

As shown in FIG. 1, in the embodiment, there is provided an electronic device. The electronic device comprises:

a wearable apparatus 110 capable of forming a ring or an approximate ring, which is able to surround a first cylinder;

a first sensor 120 arranged at least partly in the wearable apparatus 110 and towards an interior of the ring or the approximate ring, and configured to detect first biometric information of at least part of a wearer's body surrounded by the wearable apparatus 110 if the wearable apparatus 110 is worn on the part of the wearer's body;

a first processor 130 arranged in the wearable apparatus 110, and configured to determine whether the first biometric information matches first preset biometric information to obtain a determination result and to perform security processing corresponding to the determination result based on the determination result.

The electronic devices described in this embodiment may be various kinds of wearable devices, such as a smart watch, a smart wristband, a smart ankleband, a smart ring or a smart neckband, etc. These electronic devices can be worn by users. The first cylinder can be wearer's wrist, ankle or neck etc.

The wearable apparatus 110 comprises structures of wearable devices wearing on the wearer's body, such as a watchband of a smart watch, a band of a smart wristband, a band of a smart neckband, etc.

Figure 2:
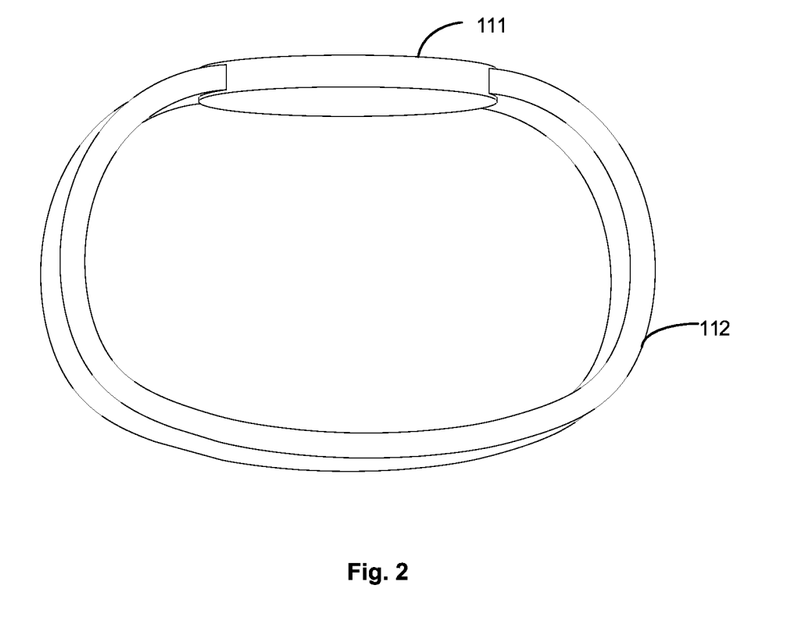
FIG. 2 is a second structural diagram of an electronic device according to an embodiment of the disclosure.

The wearable apparatus 110 comprises two kinds of structure:

First Structure:

As shown in FIG. 2, the wearable apparatus 110 comprises a main part 111 and a wearable part 112. For example, for a smart watch, a dial is the main part, and a watchband is the wearable part.

Figure 3:
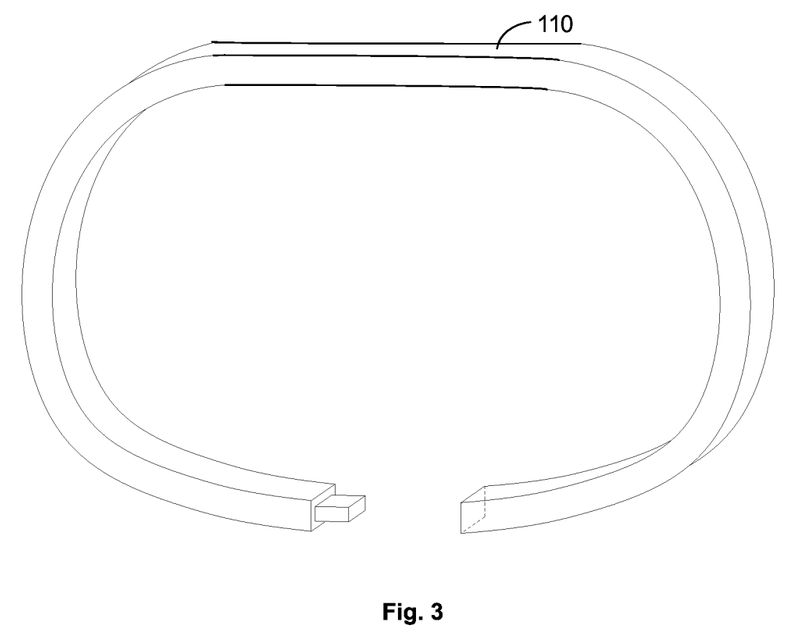
FIG. 3 is a third structural diagram of an electronic device according to an embodiment of the disclosure.

Second Structure:

As shown in FIG. 3, the wearable apparatus 110 does not have a separate main part and a separate wearable part. For example, a smart wristband may only comprise an integral band, or comprises a plurality of cylindrical objects connected end to end, but these cylindrical objects do not constitute a main part or a wearable part.

The approximate ring can be various kinds of snap rings, but openings for these snap rings are small. For example, the ratio of the length of the openings to perimeter of the approximate ring is less than a specific value, etc. FIG. 2 depicts the ring and FIG. 3 shows the approximate ring.

The first cylinder can be a specific part of the wearer's body with a cylindrical shape, such as a wrist, an ankle or a neck etc.

The arrangement of the first sensor 120 comprises at least following two types:

First type: the first sensor 120 is located completely within the wearable part 110. The first sensor is arranged in the wearable apparatus and configured to collect, through a collection window, the first biometric information of the part of the wearer's body surrounded by the wearable apparatus.

Second type: the first sensor 120 is located partly out of the wearable part 110. As such, the first biometric information can be detected by the part out of the wearable part 110.

The first processor 130 of the embodiment comprises various types of processors, including an Application Processor (AP), a Central Processing Unit (CPU), a Digital Signal Processor (DSP), a Programmable Logic Controller (PLC) or a Micro-Processing Unit (MCU), etc., or a processing unit. The processing structure comprises an application specific integrated circuit. The first processor 130 comprises one or more of processors or processing units.

Therefore, the embodiment provides an electronic device which, if worn, is capable of detecting first biometric information of a wearer's body to perform the security operations. In existing fingerprint verification and iris verification, electronic devices cannot be worn or, if worn, cannot detect the first biometric information or biometric information of the wearer's body at which the electronic device is worn. Apparently, in the embodiment, the way of detecting the first biometric information by the electronic device is more intelligent. The electronic device, if worn, detects and verifies the first biometric information, and performs corresponding security processing.

The determination result includes a successful match and a failure match. If the determination result indicates a successful match, the electronic device will consider the user as a specified authorized user or a legal user who has a privilege to use the electronic device or information stored in the electronic device, or has a high privilege to use the electronic device or inquire the information stored in the electronic device. If the determination result indicates a failure match, the electronic device will consider the user as an unauthorized user or a illegal user who does not have a privilege or has a lower privilege to use the electronic device or information stored in the electronic device.

The security processing comprises a switch between operation modes of different security levels, and further comprises whether to perform operations with corresponding security levels. Specifically, if the match is unsuccessful, it is indicated that the current user may not have a privilege to perform specific operations, such as a privilege to perform payment operations. If the electronic device detects that a payment operation is instructed by the user, this payment operation will be blocked.

In a word, the security processing described in the embodiment comprises security processing ensuring safe usage of the electronic device and security processing related to information stored in the electronic device.

The first preset biometric information is a biometric characteristic of a legal user or an authorized user and it can be biometric information pre-stored in a storage medium of the electronic device. The electronic device further includes a communication interface. The first preset biometric information can be information received by the electronic device from other electronic devices through the communication interface.

From the above, in the embodiment, there is provided an electronic device capable of detecting, if worn, biometric information of a part of a wearer's body at which the electronic device is worn, to perform a matching verification, and performing corresponding security processing according to the determination result.

Second Device Embodiment

As shown in FIG. 1, in the embodiment, there is provided an electronic device. The electronic device comprises:

a wearable apparatus 110 capable of forming a ring or an approximate ring, which is able to surround a first cylinder;

a first sensor 120 arranged at least partly in the wearable apparatus 110 and towards an interior of the ring or the approximate ring, and configured to detect first biometric information of at least part of a wearer's body surrounded by the wearable apparatus 110 if the wearable apparatus 110 is worn on the part of the wearer's body;

a first processor 130 arranged in the wearable apparatus 110, and configured to determine whether the first biometric information matches first preset biometric information to obtain a determination result and to perform security processing corresponding to the determination result based on the determination result.

The first sensor 120 is further configured to detect second biometric information;

wherein the first biometric information is different from the second biometric information.

The first sensor 120 illustrated in the embodiment can be reused to detect both the first biometric information and the second biometric information. As such, a sensor is capable of performing detection of two pieces of biometric information and the electronic device is thus delicate and powerful.

Specifically, the first sensor 120 comprises two sensing modules for detecting the first biometric information and the second biometric information, respectively. The first sensor 120 may comprise only one sensor which acquires different detection information when detecting the first biometric information and the second biometric information. Consequently, the first sensor needs to acquire two pieces of detection information respectively corresponding to the first biometric information and the second biometric information, and reuse is thus achieved.

Third Device Embodiment

As shown in FIG. 1, in the embodiment, there is provided an electronic device. The electronic device comprises:

a wearable apparatus 110 capable of forming a ring or an approximate ring, which is able to surround a first cylinder;

a first sensor 120 arranged at least partly in the wearable apparatus 110 and towards an interior of the ring or the approximate ring, and configured to detect first biometric information of at least part of a wearer's body surrounded by the wearable apparatus 110 if the wearable apparatus 110 is worn on the part of the wearer's body;

a first processor 130 arranged in the wearable apparatus 110, and configured to determine whether the first biometric information matches first preset biometric information to obtain a determination result and to perform security processing corresponding to the determination result based on the determination result.

The first sensor 120 is further configured to acquire first detection information, wherein the first detection information is raw information required for obtaining the first biometric information and the second biometric information.

In the embodiment, the first sensor 120 may only detect the first detection information, and extract the first biometric information and the second biometric information from the first detection information.

For example, the first sensor 120 comprises a mental sensor configured to collect an image of blood vessels under the wearer's skin and blood in the blood vessels. The image is the first detection information. The first biometric information can be blood vessels arrangement information in the image which includes a number of the blood vessels, size of the blood vessels and distances among the blood vessels. The first detection information further includes an image of blood. Specifically, color of the blood can be detected, and the wearer's heart rate can be extracted based on variation of the color of the blood. Apparently, in the embodiment, a detection of information, such as the first detection information, can be conducted by the first sensor 120. The first biometric information and the second biometric information can be extracted from the first detection information. The reuse of the first sensor 120 can obviously reduce amount of information collected by the first sensor 120 and times of collection. Therefore, power consumption of the electronic device is dropped, and amount of information stored in the electronic device is reduced. Apparently, this structural reuse is more advanced than the above described reuse.

Consequently, the electronic device described in the embodiment acquires the first detection information by the first sensor 120, and extracts the first biometric information and the second biometric information. Thus, the structure is delicate.

Fourth Device Embodiment

As shown in FIG. 1, in the embodiment, there is provided an electronic device. The electronic device comprises:

a wearable apparatus 110 capable of forming a ring or an approximate ring, which is able to surround a first cylinder;

a first sensor 120 arranged at least partly in the wearable apparatus 110 and towards an interior of the ring or the approximate ring, and configured to detect first biometric information of at least part of a wearer's body surrounded by the wearable apparatus 110 if the wearable apparatus 110 is worn on the part of the wearer's body;

a first processor 130 arranged in the wearable apparatus 110, and configured to determine whether the first biometric information matches first preset biometric information to obtain a determination result and to perform security processing corresponding to the determination result based on the determination result.

Figure 4:
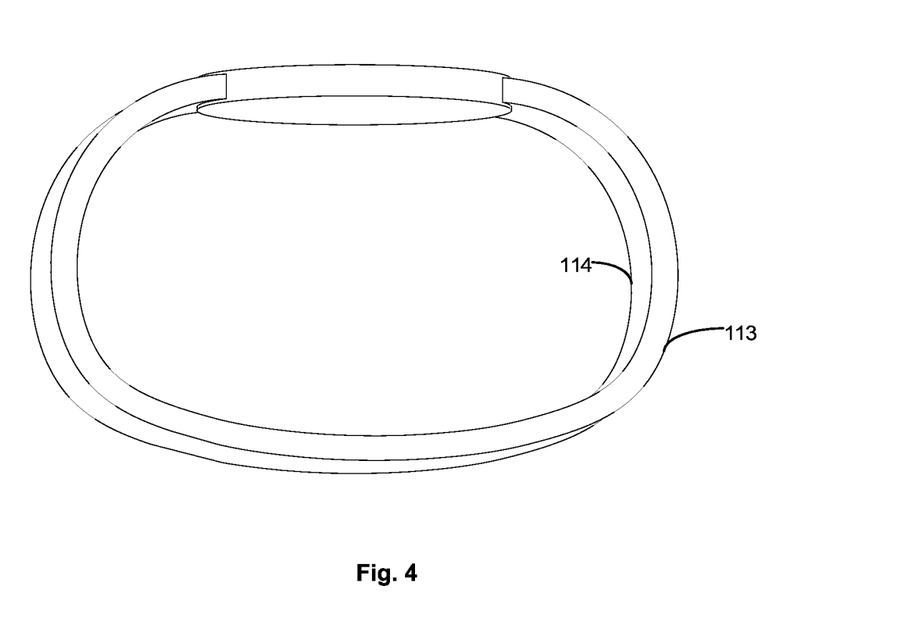
FIG. 4 is a fourth structural diagram of an electronic device according to an embodiment of the disclosure.

As shown in FIG. 4, the ring or the approximate ring has a first surface 113 and a second surface 114;

a diameter of a circle formed by the first surface 113 is a first diameter;

a diameter of a circle formed by the second surface 114 is a second diameter;

wherein the first diameter is larger than the second diameter;

a collection window is arranged on the second surface 114;

the first sensor 120 is arranged in the wearable apparatus 110 and configured to collect, through the collection window, the first biometric information of the part of the wearer's body surrounded by the wearable apparatus 110.

If the electronic device is worn, the second surface is closer to the wearer's skin at which it is worn than the first surface. A collection window is arranged on the second surface. The first sensor 120 is configured to collect, through the collection window, the first biometric information of the part of the wearer's body at which the electronic device is worn.

Based on the above described embodiment, structure of the electronic device is further specified and the structure is simple.

Fifth Device Embodiment

As shown in FIG. 1, in the embodiment, there is provided an electronic device. The electronic device comprises:

a wearable apparatus 110 capable of forming a ring or an approximate ring, which is able to surround a first cylinder;

a first sensor 120 arranged at least partly in the wearable apparatus 110 and towards an interior of the ring or the approximate ring, and configured to detect first biometric information of at least part of a wearer's body surrounded by the wearable apparatus 110 if the wearable apparatus 110 is worn on the part of the wearer's body;

a first processor 130 arranged in the wearable apparatus 110, and configured to determine whether the first biometric information matches first preset biometric information to obtain a determination result and to perform security processing corresponding to the determination result based on the determination result.

As shown in FIG. 4, the ring or the approximate ring has a first surface 113 and a second surface 114;

a diameter of a circle formed by the first surface 113 is a first diameter;

a diameter of a circle formed by the second surface 114 is a second diameter;

wherein the first diameter is larger than the second diameter;

a collection window is arranged on the second surface 114;

the first sensor 120 is arranged in the wearable apparatus 110 and configured to collect, through the collection window, the first biometric information of the part of the wearer's body surrounded by the wearable apparatus 110.

Figure 5:
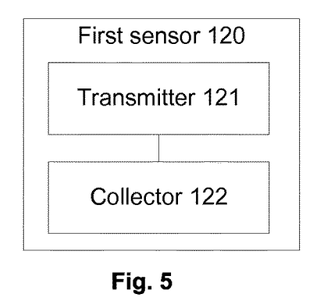
FIG. 5 is a fifth structural diagram of an electronic device according to an embodiment of the disclosure.

As shown in FIG. 5, the first sensor 120 comprises:

a transmitter 121 configured to transmit, through the collection window, collection medium to the part of the wearer's body surrounded by the wearable apparatus 110;

a collector 122 configured to collect an effect imposed by the collection medium on the part of the wearer's body surrounded by the wearable apparatus to acquire the first biometric information.

The transmitter 121 in the embodiment is configured to transmit the collection medium which can be signals such as light or wave, etc. The collector 122 acquires an effect imposed by the collection medium on the part of the wearer's body through an image collecting process or a sound collecting process to acquire the first biometric information.

The embodiment provides a specific structure of the first sensor 120. It has a simple structure and is ease of implementation.

Sixth Device Embodiment

As shown in FIG. 1, in the embodiment, there is provided an electronic device. The electronic device comprises:

a wearable apparatus 110 capable of forming a ring or an approximate ring, which is able to surround a first cylinder;

a first sensor 120 arranged at least partly in the wearable apparatus 110 and towards an interior of the ring or the approximate ring, and configured to detect first biometric information of at least part of a wearer's body surrounded by the wearable apparatus 110 if the wearable apparatus 110 is worn on the part of the wearer's body;

a first processor 130 arranged in the wearable apparatus 110, and configured to determine whether the first biometric information matches first preset biometric information to obtain a determination result and to perform security processing corresponding to the determination result based on the determination result.

As shown in FIG. 4, the ring or the approximate ring has a first surface 113 and a second surface 114;

a diameter of a circle formed by the first surface 113 is a first diameter;

a diameter of a circle formed by the second surface 114 is a second diameter;

wherein the first diameter is larger than the second diameter;

a collection window is arranged on the second surface 114;

the first sensor 120 is arranged in the wearable apparatus 110 and configured to collect, through the collection window, the first biometric information of the part of the wearer's body surrounded by the wearable apparatus 110.

As shown in FIG. 5, the first sensor 120 comprises:

a transmitter 121 configured to transmit, through the collection window, collection medium to the part of the wearer's body surrounded by the wearable apparatus 110;

a collector 122 configured to collect an effect imposed by the collection medium on the part of the wearer's body surrounded by the wearable apparatus to acquire the first biometric information.

the transmitter 121 is configured to transmit, through the collection window, light with a specified wavelength to the part of the wearer's body surrounded by the wearable apparatus 110;

the collector 122 is configured to collect, through the collection window, an image depicting illumination of the part of the wearer's body surrounded by the wearable apparatus 110 by the light with the specified wavelength.

The transmitter 121 in the embodiment can include a emission structure of emitting light with specified wavelength to emit light with specified wavelength to the wearer's body, such as a green light emission structure or a red light emission structure. The collector 122 includes an image collecting structure, such as a webcam or a camera. If the transmitter 121 is emitting light with specified wavelength, the collector 122 collects an effect imposed by the light with specified wavelength on the part of the wearer's body, to collect the biometric information of the wearer's body. Such as blood vessel arrangement information of a wrist at which a smart watch is worn.

The embodiment provides a specific structure of the first sensor 120. It has a simple structure and is ease of implementation.

Seventh Device Embodiment

As shown in FIG. 1, in the embodiment, there is provided an electronic device. The electronic device comprises:

a wearable apparatus 110 capable of forming a ring or an approximate ring, which is able to surround a first cylinder;

a first sensor 120 arranged at least partly in the wearable apparatus 110 and towards an interior of the ring or the approximate ring, and configured to detect first biometric information of at least part of a wearer's body surrounded by the wearable apparatus 110 if the wearable apparatus 110 is worn on the part of the wearer's body;

a first processor 130 arranged in the wearable apparatus 110, and configured to determine whether the first biometric information matches first preset biometric information to obtain a determination result and to perform security processing corresponding to the determination result based on the determination result.

As shown in FIG. 4, the ring or the approximate ring has a first surface 113 and a second surface 114;

a diameter of a circle formed by the first surface 113 is a first diameter;

a diameter of a circle formed by the second surface 114 is a second diameter;

wherein, the first diameter is larger than the second diameter;

a collection window is arranged on the second surface 114;

the first sensor 120 is arranged in the wearable apparatus 110 and configured to collect, through the collection window, the first biometric information of the part of the wearer's body surrounded by the wearable apparatus 110.

As shown in FIG. 5, the first sensor 120 comprises:

a transmitter 121 configured to transmit, through the collection window, collection medium to the part of the wearer's body surrounded by the wearable apparatus 110;

a collector 122 configured to collect an effect imposed by the collection medium on the part of the wearer's body surrounded by the wearable apparatus to acquire the first biometric information.

The transmitter 121 is configured to transmit, through the collection window, sound waves with a specified frequency to the part of the wearer's body surrounded by the wearable apparatus 110;

the collector 122 is configured to collect, through the collection window, an image depicting reflection of the sound waves with the specified frequency from the part of the wearer's body surrounded by the wearable apparatus 110.

The transmitter 121 in the embodiment can be a sound wave transmitting apparatus which transmits sound wave with specified frequency through the collection window. The sound wave with the specified frequency can be a supersonic wave. The collector 122 collects, through the collector, an image depicting reflection of the sound waves with the specified frequency from the part of the wearer's body, and obtains the first biometric information based on the image depicting the reflection. The first biometric information can be skeleton situation information. The skeleton situation information includes information such as size of the skeleton, shape of the skeleton, etc.

Therefore, the embodiment provides an electronic device different from the above described device embodiments. The electronic device has a simple structure and is delicate.

Eighth Device Embodiment

As shown in FIG. 1, in the embodiment, there is provided an electronic device. The electronic device comprises:

a wearable apparatus 110 capable of forming a ring or an approximate ring, which is able to surround a first cylinder;

a first sensor 120 arranged at least partly in the wearable apparatus 110 and towards an interior of the ring or the approximate ring, and configured to detect first biometric information of at least part of a wearer's body surrounded by the wearable apparatus 110 if the wearable apparatus 110 is worn on the part of the wearer's body;

a first processor 130 arranged in the wearable apparatus 110, and configured to determine whether the first biometric information matches first preset biometric information to obtain a determination result and to perform security processing corresponding to the determination result based on the determination result.

The first biometric information includes inner structural characteristics of the wearer's body.

The first biometric information described in the embodiment is the inner structural characteristics of the wearer's body. Different from information which can be collected from surface of the wearer's body, such as fingerprint and iris, etc., the first biometric information should be collected from the inner structure of the wearer's body. For the biometric information such as fingerprint and iris, illegal users may illegally pass the security matching verification of the electronic device by corresponding fingerprint gloves or contact lens obtained by stealing the fingerprint and the iris. The electronic device described in the embodiment collects the inner structural characteristics of the wearer's body. Comparing with the outer structural characteristics of the wearer's body, the inner structural characteristics of the wearer's body is more difficult to be reformed or simulated. Therefore, the security of the matching verification is improved.

Specifically, the first biometric information includes information about blood vessel arrangement and/or skeleton arrangement of the cylindrical object. The information about blood vessel arrangement includes a number of blood vessels, cross-sectional area of blood vessels, distance between two blood vessels, etc. The information about skeleton arrangement includes cross-sectional area of the skeleton, shape of the skeleton and distance between the skeleton, etc. The blood vessel arrangement and skeleton arrangement of the wearer's body can hardly be falsified without operation. It is more stable and more identifiable. It cannot be collected by the illegal users without professional tools with penetrating collection abilities. Apparently, the security of the matching verification is dramatically improved, and the usage security and the security of information stored in the electronic device is increased.

Ninth Device Embodiment

As shown in FIG. 1, in the embodiment, there is provided an electronic device. The electronic device comprises:

a wearable apparatus 110 capable of forming a ring or an approximate ring, which is able to surround a first cylinder;

a first sensor 120 arranged at least partly in the wearable apparatus 110 and towards an interior of the ring or the approximate ring, and configured to detect first biometric information of at least part of a wearer's body surrounded by the wearable apparatus 110 if the wearable apparatus 110 is worn on the part of the wearer's body;

a first processor 130 arranged in the wearable apparatus 110, and configured to determine whether the first biometric information matches first preset biometric information to obtain a determination result and to perform security processing corresponding to the determination result based on the determination result.

The electronic device has a worn status and an unworn status. For example, the unworn status of the smart watch is that two chains of the watch are unbuckled. The worn status is that two bands of the smart watch are buckled together. For another example, a smart wristband forms an approximate ring. In the worn status, opening of the approximate ring is less than opening in the unworn status.

The wearable apparatus 110 forms the ring or the approximate ring in the worn status of the electronic device.

Figure 6:
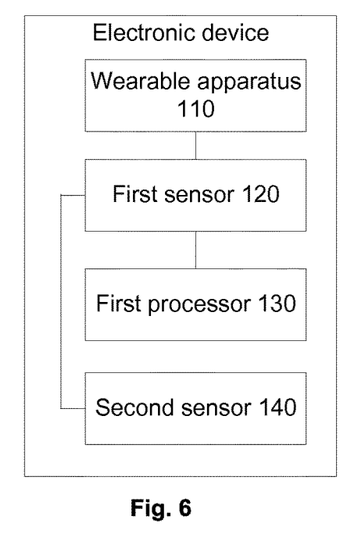
FIG. 6 is a sixth structural diagram of an electronic device according to an embodiment of the disclosure.

As shown in FIG. 6, the electronic device further comprises:

a second sensor 140 arranged in the wearable apparatus 110 and configured to detect a status of the electronic device to obtain a detection result;

the first sensor 120 is configured to detect the first biometric information of the part of the cylindrical object surrounded by the wearable apparatus 110 if the detection result indicates that the electronic device is switched from the unworn status to the unworn status.

The electronic device in the embodiment further comprises a second sensor 140 configured to detect the status of the electronic device to obtain the detection result. The detection result will be used to determine whether the first sensor 120 detects the first biometric information. In this way, if the electronic device is worn, the electronic device will automatically trigger the detection of the first biometric information to perform the matching verification and conduct the corresponding security processing. The usage security and information security of the electronic device is thus ensured, and intelligence of the electronic device and experience of the users are improved.

Since information processing in the electronic device is fast, i.e. the verification will be accomplished in a very short time after the electronic device is worn, usage of the electronic device will not be affected.

For example, the electronic device is in a dormant status before it is worn, and it can only perform limited operations, for example, simple operations such as detection of the second sensor. If the users need to check other information, it cannot be achieved by the electronic device. After it is worn and the matching is approved, the first processor 130 performs the security processing such as switch of status to switch the electronic device from the dormant status to the active status. As such, after the electronic device is worn, it can be used by the user to perform operations such as counting a number of steps if the user is walking.

Tenth Device Embodiment

As shown in FIG. 1, in the embodiment, there is provided an electronic device. The electronic device comprises:

a wearable apparatus 110 capable of forming a ring or an approximate ring, which is able to surround a first cylinder;

a first sensor 120 arranged at least partly in the wearable apparatus 110 and towards an interior of the ring or the approximate ring, and configured to detect first biometric information of at least part of a wearer's body surrounded by the wearable apparatus 110 if the wearable apparatus 110 is worn on the part of the wearer's body;

a first processor 130 arranged in the wearable apparatus 110, and configured to determine whether the first biometric information matches first preset biometric information to obtain a determination result and to perform security processing corresponding to the determination result based on the determination result.

the electronic device has a first mode and a second mode;

the first mode has a higher security level than the second mode;

the first processor 130 is configured to set the electronic device to the first operating state if the first biometric information matches the first preset biometric information and to the second operating state if the first biometric information does not match the first preset biometric information.

The first processor 130 described in the embodiment controls the switch of the operating state of the electronic device.

For example, the first processor comprises a central control module and a micro control module.

The electronic device further comprises a central control module. If the electronic device is in the first operating state, the central control module initiates the operating state in which the central control module can perform a large amount of operations. If the electronic device is in the second operating state, the central module is switched off and the electronic device switch to a non-operating state in which the electronic device can only perform limited amount of operations.

Power consumption of the micro control module described in the embodiment is much less than the central control unit and processing ability of the first micro control unit is also much less than the central control unit. If the electronic device is in the first operating state, the central control module is in the operating state and the micro control module can be in the operating state or in the non-operating state. If the electronic device is in the second operating state, the central control module is in the non-operating state and the micro control module can only be in the operating state, and the first sensor is also in the operating state. Other parts in the electronic device, such as display unit, etc., can stay in the non-operating state to save power. As such, a configuration of the micro control module with small power consumption and the first sensor 120 is implemented, and smart verification and controlling start-up of the central control module in the electronic device is achieved.

The central control module can be a variety of processor in the electronic device, such as a Central Processing Unit (CPU) and an Application Processor (AP). The micro control module described in the embodiment can be processors such as the Micro-Processing Unit (MCU). The matching of the electronic device can be implemented by the central control module.

Therefore, the embodiment provides an electronic device which is capable of switching among the operating states of the electronic device based on the first biometric information of a wearer's body.

Eleventh Device Embodiment

Figure 7:
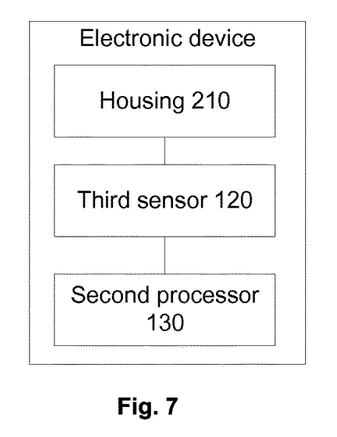
FIG. 7 is a seventh structural diagram of an electronic device according to an embodiment of the disclosure.

As shown in FIG. 7, in the embodiment, there is provided an electronic device. The electronic device comprises:

housing 210;

a third sensor 220 arranged at least partly in the housing and configured to detect an inner structure of a first cylindrical object within a range of a first sensor to obtain first biometric information;

a second processor 230 arranged in the housing, and configured to determine whether the first biometric information matches first preset biometric information to obtain a determination result and to perform security processing corresponding to the determination result based on the determination result.

The housing of the electronic device described in the embodiment includes various types of housing, such as housing of a cellphones, housing of wearable devices, etc.

Specific structure of the first sensor 220 can be referred to the first sensor in the above illustrated device embodiments, which is omitted for simplicity. The detection of the second sensor 220 is on the inner structure of the wearer's body, for example, inner characteristics such as blood vessel arrangement and/or skeleton arrangement, to obtain the first biometric information.

The specific structure of the second processor 230 is the same or similar to the first processor in the above described embodiments which is omitted here for simplicity.

In the embodiment, the first biometric information of the inner structure of the wearer's body is utilized to perform the verification of matching, and usage security and information security of the electronic device is improved.

The inner characteristics of the wearer's body is opposed to outer characteristics of the wearer's body. The outer characteristics include characteristics which can be obtained from scanning the wearer's surface, such as fingerprint characteristics or iris characteristics, etc. The inner characteristics is the inner structural characteristics of the wearer's body, which can be considered as structures under the wearer's skin and can not be directly seen from eyes.

First Method Embodiment

Figure 8:
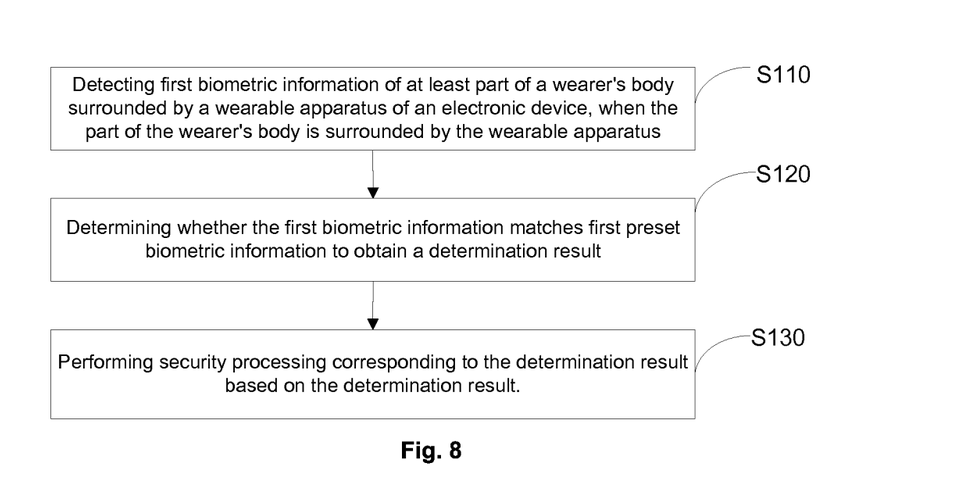
FIG. 8 is a flowchart of an information processing method according to an embodiment of the disclosure.

As shown in FIG. 8, in the embodiment, there is provided an information processing method. The method comprises:

At Step S110, first biometric information of at least part of a wearer's body surrounded by a wearable apparatus of an electronic device is detected, if the part of the wearer's body is surrounded by the wearable apparatus.

At Step S120, whether the first biometric information matches first preset biometric information is determined to obtain a determination result.

At Step S130, security processing corresponding to the determination result is performed based on the determination result.

The information processing method described in the embodiment can be applied to various kinds of wearable devices, such as smart wristbands, smart watches, smart rings, etc.

In the embodiment, if the electronic device is worn, the first biometric information of at least part of a wearer's body surrounded by a wearable apparatus of an electronic device is detected. As such, if the electronic device is worn, the biometric information of the wearer's body at which the electronic device is worn to obtain the first biometric information.

At Step S120, whether the first biometric information matches first preset biometric information is determined to obtain a determination result. The determination result includes a successful match and a failure match. At Step S130, the security processing is performed based on the determination result.

As such, if the electronic device is a smart watch, the biometric information of the wearer's wrist at which the electronic device is worn is detected by the smart watch to control the electronic device to perform the corresponding security processing. In this way, the verification of matching can be achieved without operations such as inputting passwords by the user, scanning fingerprint, and identifying iris, and the usage security and the information security of the electronic device is improved.

For example, the electronic device can be a smart watch or a smart wristband. The user performs a payment operation by using the electronic device. During the payment operation, a matching verification such as input of a payment password is required. However, size of the wearable devices is usually small and inputting a password is thus not convenient. If fingerprint scanning or iris scanning is adopted, a finger pressing by the user or pointing to the eyes by the electronic device are needed to perform scanning. These matching verifications need assistance by the user on electronic devices. By the information processing method described in the embodiment, if the electronic device is worn, acquisition and matching of the first biometric information is performed automatically. If the matching is successful, the payment is conducted automatically. In this whole process, inputting a password is not needed and finger pressing by the user and raising arm to perform an iris scanning are also not required. Thus, the process of security matching verification is simplified and intelligence of the electronic device and experience of the users are improved.

As an improvement of the embodiment, the first biometric information represents the inner structure of the wearer's body. The first biometric information includes information about blood vessel arrangement and/or skeleton arrangement of the wearer's body. Although fingerprint verification and iris verification are verifications based on biometric characteristics of the user, these verifications are for biometric characteristics of the surface of the wearer's body. However, the information processing method described in the present application performs verification on the biometric characteristics inside the wearer's body, and thus possesses advanced security.

Second Method Embodiment

As shown in FIG. 8, in the embodiment, there is provided an information processing method. The method comprises:

At Step S110, first biometric information of at least part of a wearer's body surrounded by a wearable apparatus of an electronic device is detected, if the part of the wearer's body is surrounded by the wearable apparatus.

At Step S120, whether the first biometric information matches first preset biometric information is determined to obtain a determination result.

At Step S130, security processing corresponding to the determination result is performed based on the determination result.

The electronic device further comprises a first sensor arranged at least partly in the wearable apparatus, the first sensor being able to detect second biometric information.

The Step S110 comprises:
detecting the first biometric information by using the first sensor,
wherein the first biometric information is different from the second biometric information.

In the embodiment, the first sensor is used to perform detection which is arranged at least partly in the wearable apparatus. Structure of the first sensor and the wearable apparatus can be referred to the above illustrated device embodiments, which is omitted for simplicity.

Additionally, the first sensor described in the embodiment is further configured to detect the second biometric information. The information processing method described in the embodiment further comprises: reusing the first sensor which is able to detect the second biometric information to detect the first biometric information of the part of a wearer's body surrounded by a wearable apparatus. By reuse of the first sensor to detect the first biometric information, the existing modules of the electronic device are better used and utilization of the electronic device is improved.

The second biometric information is used to detect the body condition of the user rather than performing security verification. The first biometric information described in the disclosure is static biometric information which will not change after the user is grown up if no interference from the environment or disease happens. The second biometric information is dynamic biometric information of the user, such as heart rate or blood flow rate, etc.

The information processing method in the embodiment improves utilization of the first sensor of the electronic device and is ease of implementation.

Third Method Embodiment

As shown in FIG. 8, in the embodiment, there is provided an information processing method. The method comprises:

At Step S110, first biometric information of at least part of a wearer's body surrounded by a wearable apparatus of an electronic device is detected, if the part of the wearer's body is surrounded by the wearable apparatus.

At Step S120, whether the first biometric information matches first preset biometric information is determined to obtain a determination result.

At Step S130, security processing corresponding to the determination result is performed based on the determination result.

The electronic device further comprises a first sensor arranged at least partly in the wearable apparatus, the first sensor being able to detect second biometric information.

The Step S110 comprises:
detecting the first biometric information by using the first sensor,
wherein the first biometric information is different from the second biometric information.

The Step S110 further comprises:
acquiring first detection information by using the first sensor, wherein the first detection information is raw information required for obtaining the first biometric information and the second biometric information;
extracting the first biometric information from the first detection information.

The first sensor described in the embodiment collects the first detection information and extracts the first biometric information and/or the second biometric information from the first detection information. Since the detection of the first biometric information is needed at Step S110, the first biometric information is required to be extracted from the first detection information.

For example, the first detection information is a collected image of blood vessels under the wearer's skin and blood in the vessels. The vessel arrangement information of the part of the wearer's body surrounded by the electronic device is extracted from the collected image, and the heart rage information of the user can be determined based on variation of the color of the blood. The vessel arrangement information is the first biometric information and the heart rate information is the second biometric information. In the information processing method described in the embodiment, a collection is made by the first sensor and the first biometric information and the second biometric information is extracted. In this way, if the electronic device monitors the heart rate information by the heart rate sensor which is used as the first sensor, an image is selected from the collected images which are used for heart rate detection to extract the blood vessel arrangement information and then to further extract the first biometric information. If it is determined whether the first biometric information matches first preset biometric information, no detection on the first detection information is needed, and operation of the electronic device is thus simplified.

Fourth Method Embodiment

As shown in FIG. 8, in the embodiment, there is provided an information processing method. The method comprises:

At Step S110, first biometric information of at least part of a wearer's body surrounded by a wearable apparatus of an electronic device is detected, if the part of the wearer's body is surrounded by the wearable apparatus.

At Step S120, whether the first biometric information matches first preset biometric information is determined to obtain a determination result.

At Step S130, security processing corresponding to the determination result is performed based on the determination result.

Figure 9:
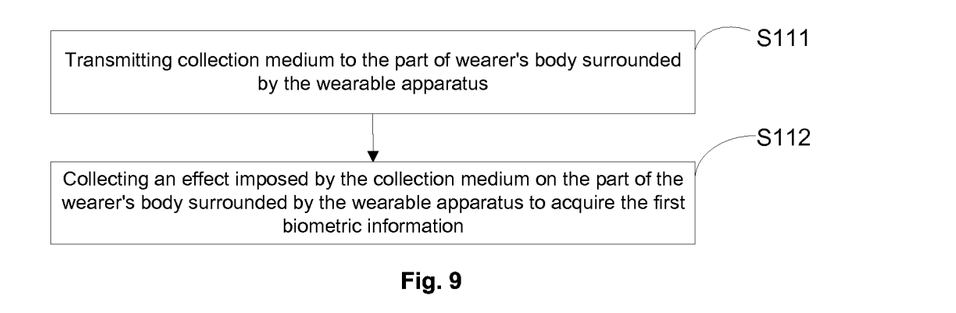
FIG. 9 is a flowchart of detecting first biometric information according to an embodiment of the disclosure.

As shown in FIG. 9, the Step S110 comprises:

At Step 111, collection medium is transmitted to the part of wearer's body surrounded by the wearable apparatus;

At Step 112, an effect imposed by the collection medium on the part of the wearer's body surrounded by the wearable apparatus is collected to acquire the first biometric information.

In the embodiment, the first biometric information is acquired by transmitting collection medium and collecting the effect imposed by the collection medium on the wearer's body.

The way of detection is ease of implementation. There are various of collection medium. Following two types of ways are provided:

First Type:

The Step S111 comprises:

transmitting light with specified wave length to the part of wearer's body surrounded by the wearable apparatus;

The Step S112 comprises:

collecting an image depicting illumination of the part of the wearer's body surrounded by the wearable apparatus by the light with the specified wavelength.

Second Type:

The Step S111 comprises:

transmitting sound waves with a specified frequency to the part of wearer's body surrounded by the wearable apparatus;

The Step S112 comprises:

collecting an image depicting reflection of the sound waves with the specified wavelength from the part of the wearer's body surrounded by the wearable apparatus.

In the embodiment, the above two ways introduce the acquisition methods of the first biometric information by using light and sound wave. The implementation is simple and the security level is high.

In the first method, the detected first biometric information is the wearer's blood vessel arrangement information. In the second method, the detected first biometric information is the wearer's skeleton arrangement information. The information is slowly changed information in the wearer's body and will not vary after the user is grown up if no extreme event happens.

In a few embodiments provided in present disclosure, it should be appreciated that the disclosed devices and method can be implemented in other ways. The above described device embodiments are only illustrative. For instance, the division of the units is only a logic functional division. In practical implementations, other ways of division are possible, e.g. multiple units or components could be combined or integrated into another system, or some features can be omitted or not executed. Additionally, the coupling, or direct coupling, or communicative connection among respective components shown or discussed with each other could be indirect coupling or communicative connection by some interfaces, appliances, or units, which could be electric, mechanical, or in other forms.

The units explained above as discrete components may or may not be physically separated. Components shown as units may or may not be physical units, i.e. may be located in one place or distributed in multiple network units, some or all of which can be selected based on actual need to achieve the goal of solutions of the embodiments.

Additionally, respective functional units in the embodiments of the present disclosure can all be integrated in a single processing module, or respective units can be separate units, or two or more units can be integrated in a unit. The above described integrated unit can be implemented either in hardware, or in hardware and software functional units.

Those skilled in the art may contemplate that: all or part of the steps of the above illustrated method embodiments can be implemented by hardware with regard to program instructions. The above described program can be stored in a computer readable access medium, which, if executed, performs steps included in the above-illustrated method embodiments. The above illustrated storage medium comprises various medium capable of storing program codes, such as portable storage devices, Read-Only Memory (ROM), Random Access Memory (RAM), magnetic disk or optical disc etc.

What has been described are specific implementations of the present disclosure. The scope of the present disclosure is not limited to these embodiments. Any variants or substitutions that are readily envisaged by those skilled in the art without departing from the spirit and principle of the present disclosure are to be encompassed by the scope of the present disclosure. Therefore, the scope of the present disclosure should be defined by the claims.

What is claimed is:

1. An electronic device, comprising:
a wearable apparatus capable of forming a ring or an approximate ring, which is able to surround a first cylinder;
a first sensor arranged at least partly in the wearable apparatus and towards an interior of the ring or the approximate ring, and configured to detect first biometric information of at least part of a wearer's body surrounded by the wearable apparatus when the wearable apparatus is worn on the part of the wearer's body; and
a first processor arranged in the wearable apparatus, and configured to determine whether the first biometric information matches first preset biometric information to obtain a determination result and to perform security processing corresponding to the determination result based on the determination result,
wherein the electronic device has a first operating state having a first security level and a second operating state having a second security level, wherein the first security level is higher than the second security level; and
wherein the first processor is further configured to set the electronic device to the first operating state when the first biometric information matches the first preset biometric information and to the second operating state when the first biometric information does not match the first preset biometric information,
wherein the first sensor is further configured to detect second biometric information, and
wherein the first biometric information is of a different type from that of the second biometric information.

2. The electronic device of claim 1, wherein
the first sensor is further configured to acquire first detection information, wherein the first detection information is raw information required for obtaining the first biometric information and the second biometric information.

3. The electronic device of claim 1, wherein
the ring or the approximate ring has a first surface and a second surface;
a diameter of a circle formed by the first surface is a first diameter;
a diameter of a circle formed by the second surface is a second diameter, wherein the first diameter is larger than the second diameter;
a collection window is arranged on the second surface;
the first sensor is arranged in the wearable apparatus and configured to collect, through the collection window, the first biometric information of the part of the wearer's body surrounded by the wearable apparatus.

4. The electronic device of claim 3, wherein
the first sensor comprises:
a transmitter configured to transmit, through the collection window, collection medium to the part of the wearer's body surrounded by the wearable apparatus;
a collector configured to collect an effect imposed by the collection medium on the part of the wearer's body surrounded by the wearable apparatus to acquire the first biometric information.

5. The electronic device of claim 4, wherein
the transmitter is configured to transmit, through the collection window, light with a specified wavelength to the part of the wearer's body surrounded by the wearable apparatus;
the collector is configured to collect, through the collection window, an image depicting illumination of the part of the wearer's body surrounded by the wearable apparatus by the light with the specified wavelength.

6. The electronic device of claim 4, wherein
the transmitter is configured to transmit, through the collection window, sound waves with a specified frequency to the part of the wearer's body surrounded by the wearable apparatus;
the collector is configured to collect, through the collection window, an image depicting reflection of the sound waves with the specified frequency from the part of the wearer's body surrounded by the wearable apparatus.

7. The electronic device of claim 1, wherein
the electronic device has a worn status and an unworn status;
the wearable apparatus forms the ring or the approximate ring in the worn status of the electronic device;
the electronic device further comprises: a second sensor arranged in the wearable apparatus and configured to detect a status of the electronic device to obtain a detection result;
the first sensor is configured to detect the first biometric information of the part of the wearer's body surrounded by the wearable apparatus if the detection result indicates that the electronic device is switched from the unworn status to the worn status.

8. The electronic device of claim 1, wherein the first biometric information comprises static biometric information that does not change once the user has grown up and the second biometric information comprises dynamic biometric information.

9. The electronic device of claim 8, wherein
the first biometric information includes inner structural characteristics of the wearer's body.

10. The electronic device of claim 9, wherein
the first biometric information includes information about blood vessel arrangement and/or skeleton arrangement of the wearer's body.

11. An electronic device, comprising:
a housing;
a third sensor arranged at least partly in the housing and configured to detect an inner structure of a wearer's body within a range of a first sensor to obtain first biometric information; and
a second processor arranged in the housing, and configured to determine whether the first biometric information matches first preset biometric information to obtain a determination result and to perform security processing corresponding to the determination result based on the determination result,
wherein the electronic device has a first operating state having a first security level and a second operating state having a second security level, wherein the first security level is higher than the second security level; and
wherein the second processor is further configured to set the electronic device to the first operating state when the first biometric information matches the first preset biometric information and to the second operating state when the first biometric information does not match the first preset biometric information,
wherein the third sensor is further configured to detect second biometric information, and
wherein the first biometric information is of a different type from that of the second biometric information.

12. The electronic device of claim 11, wherein the first biometric information comprises static biometric information that does not change once the user has grown up and the second biometric information comprises dynamic biometric information.

13. An information processing method, comprising:
   detecting first biometric information of at least part of a wearer's body surrounded by a wearable apparatus of an electronic device, when the part of the wearer's body is surrounded by the wearable apparatus;
   determining whether the first biometric information matches first preset biometric information to obtain a determination result; and
   performing security processing corresponding to the determination result based on the determination result;
   wherein the performing the security processing comprises setting the electronic device to a first operating state when the first biometric information matches the first preset biometric information and to a second operating state when the first biometric information does not match the first preset biometric information; and
   wherein the first operating state has a first security level and the second operating state has a second security level, wherein the first security level is higher than the second security level,
   wherein the electronic device further comprises a first sensor arranged at least partly in the wearable apparatus, the first sensor being able to detect second biometric information;
   the detecting the first biometric information of the part of wearer's body surrounded by the wearable apparatus comprises detecting the first biometric information by using the first sensor, wherein the first biometric information is of a different type from that of the second biometric information.

14. The method of claim 13, wherein
   the detecting the first biometric information by using the first sensor comprises:
   acquiring first detection information by using the first sensor, wherein the first detection information is raw information required for obtaining the first biometric information and the second biometric information;
   extracting the first biometric information from the first detection information.

15. The method of claim 13, wherein
   the detecting the first biometric information of the at least part of the wearer's body surrounded by the wearable apparatus of the electronic device if the part of the wearer's body is surrounded by the wearable apparatus comprises:
   transmitting collection medium to the part of wearer's body surrounded by the wearable apparatus;
   collecting an effect imposed by the collection medium on the part of the wearer's body surrounded by the wearable apparatus to acquire the first biometric information.

16. The method of claim 15, wherein
   the transmitting collection medium to the part of wearer's body surrounded by the wearable apparatus comprises:
   transmitting light with specified wave length to the part of wearer's body surrounded by the wearable apparatus;
   the collecting the effect imposed by the collection medium on the part of the wearer's body surrounded by the wearable apparatus to acquire the first biometric information comprises: collecting an image depicting illumination of the part of the wearer's body surrounded by the wearable apparatus by the light with the specified wavelength.

17. The method of claim 13, wherein
   the transmitting collection medium to the part of wearer's body surrounded by the wearable apparatus comprises:
   transmitting sound waves with a specified frequency to the part of wearer's body surrounded by the wearable apparatus;
   the collecting the effect imposed by the collection medium on the part of the wearer's body surrounded by the wearable apparatus to acquire the first biometric information comprises: collecting an image depicting reflection of the sound waves with the specified wavelength from the part of the wearer's body surrounded by the wearable apparatus.

18. The method of claim 13, wherein the first biometric information comprises static biometric information that does not change once the user has grown up and the second biometric information comprises dynamic biometric information.

* * * * *